3,038,735
MEANS FOR ADJUSTABLY RAISING OR LOWERING THE FRAME OF A WHEEL SUPPORTED VEHICLE
Wayne M. Wistrom and Harold D. Cook, Des Moines, Iowa, assignors to Western Tool and Stamping Company, Des Moines, Iowa, a corporation of Iowa
Filed May 19, 1960, Ser. No. 30,326
8 Claims. (Cl. 280—43.17)

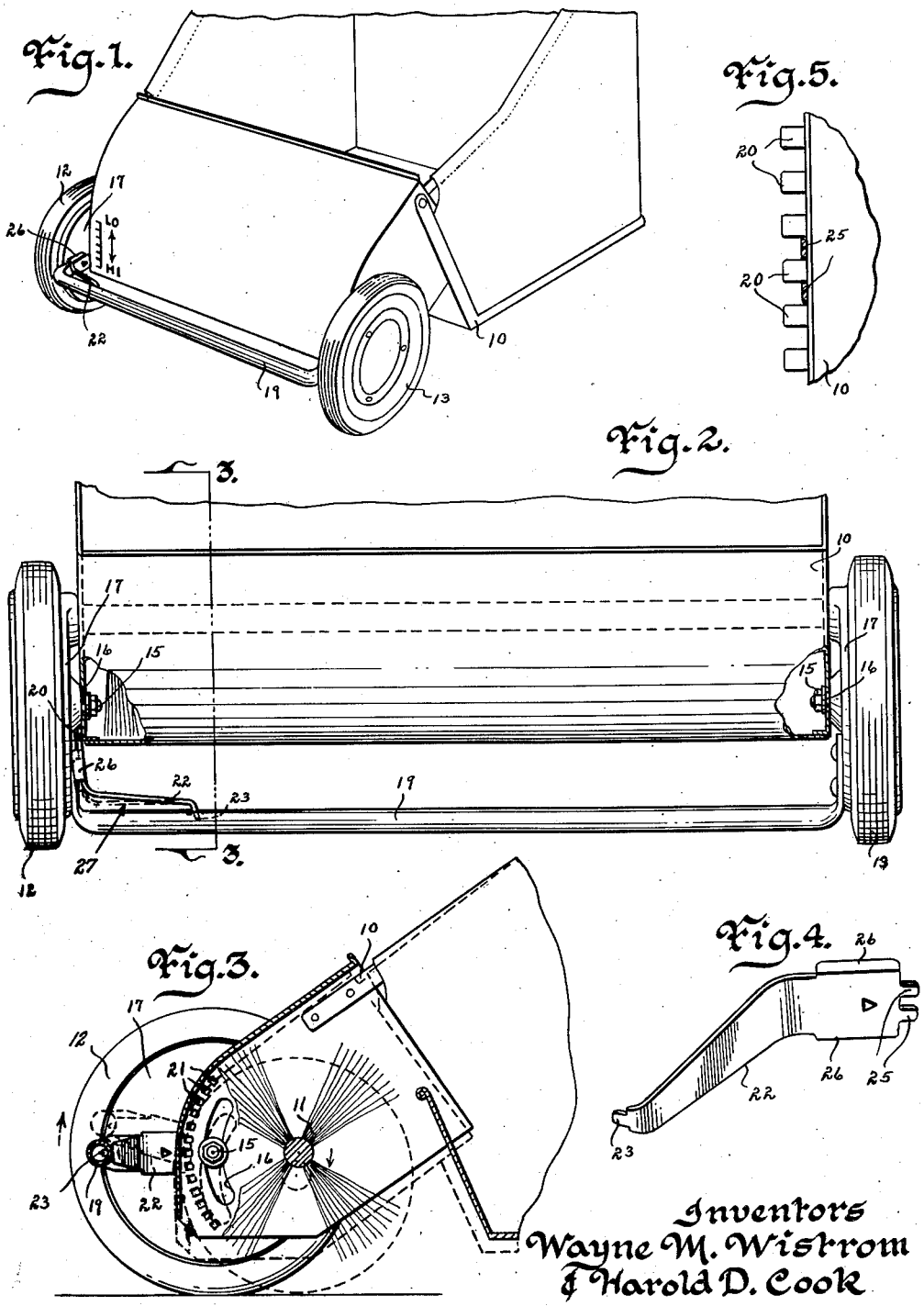

This invention relates to a means for adjustably raising or lowering the frame of a wheel supported vehicle and more particularly to a means for accomplishing the lowering or raising of the brush of a lawn sweeper.

Many types of equipment such as mowing machines, earth implements, lawn sweepers and the like, require certain parts to be vertically movably adjustable relative to the ground surface. Many different types of adjustable raising and lowering means have been used heretofore. Usually such means has followed the principle of a tightenable supporting bolt means extending through one or more chassis slot openings. The chief objection to such means is the difficulty of first loosening the bolt means with a wrench, making and holding the desired adjustment, and then re-tightening the bolt means. Often the bolt means is located at an awkward position for manual manipulation. Furthermore, the adjustment is a tedious slow operation.

Therefore one of the principal objects of our invention is to provide a means for adjustably raising or lowering a wheel supported vehicle that is easily and quickly actuated.

A further object of this invention is to provide an adjustable raising or lowering means that requires no tools to operate.

A still further object of this invention is to provide an adjustable lowering or raising means that provides leverage for the manual moving of the device into the desired relative adjustment.

A still further object of this invention is to provide an adjustable means for the raising or lowering of a wheeled chassis that is positioned for handy manual manipulation.

Still further objects of our invention are to provide an adjustable lowering and raising means for lawn sweepers and the like that is economical in manufacture and durable in use.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

FIG. 1 is a front perspective view of our device in use;

FIG. 2 is a top view of the front portion of a lawn sweeper using our invention;

FIG. 3 is a cross-sectional view of our device taken on line 3—3 of FIG. 2 and more fully illustrates its construction;

FIG. 4 is an enlarged perspective view of the spring release catch means; and

FIG. 5 is an enlarged front view of a section showing the holding teeth.

In the drawings we have used the numeral 10 to designate the chassis of a lawn sweeper having the usual rotatably mounted brush 11 at near its forward end. At each side of the chassis 10 and forward of the axle of the brush 11 are the usual front supporting wheels 12 and 13, respectively. The bolt axle 15 of each wheel extends through an arcuate slot 16 in the adjacent side of the chassis. These arcuate slots 16 are concentric with and forward of the axle of the brush 11. Within the hub of each wheel are the usual gears (not shown) operatively connecting the wheels to the axle of the brush 11. Obviously, the lowering or raising of the wheel axles in the slots 16, will accordingly raise or lower the position of the wheels relative to the chassis. Accordingly the brush 11 will be thereby lowered relative to the ground surface when the axles are raised, and will be raised relative to the ground surface when the wheel axles are lowered relative to the chassis. Each wheel has an inner fixed shield 17 which rotatably embraces the brush shaft. Therefore, the hinged pivot point of the wheels is at the axle shaft of the brush. The numeral 19 designates a forwardly extending U-bar having one end secured to the forward area of the shield 17 of the wheel 12 and its other end secured to the shield 17 of the wheel 13 as shown in FIG. 2. This bar 19 provides an excellent readily available handhold at the forward end of the vehicle for manually adjustably lowering or raising the axles of the wheels in the slots 16. If the bar is lowered, the wheels will be accordingly lowered and if the bar is pulled upwardly the wheels will be accordingly raised. In the drawings we show only one releasable locking means for holding the bar in the adjustable selected position. However, if desired a locking means may be employed at each end portion of the U-bar, it being understood that such two locking means would be duplicates of each other. In the locking forward end side panel of the chassis we cut out thereof an arcuate row of teeth 20. These teeth are spaced apart, and are bent from their cuts 21 to extend laterally outwardly, toward the wheel as shown in FIG. 5. The numeral 22 generally designates the leaf spring locking member. The outer end of this locking member 22 has a lug 23 engaging a hole in the inner side of the U-bar as shown in FIG. 3. From the lug portion of the locking member it extends laterally and rearwardly at the inner rear side of the U-bar until it reaches a point near the rearwardly extending end of the U-bar at which point it bends to extend substantially rearwardly toward the teeth 20 as shown in FIG. 2. On the rear end of the locking bar are one or more projections 25, capable of selectively engaging the teeth 20 of the row of teeth of the side panel of the chassis. On the top and bottom of the rear end of the locking member is an outwardly extending flange 26. These two flanges slidably embrace the top and bottom of the rearwardly extending end portion of the U-bar. Because of the construction and arrangement of the locking member at the inside corner of the U-bar, there will be a space at 27 between the main length of the U-bar and the lateral length of the locking member. Also the spring tension of the leaf spring locking member will be such relative to the U-bar, that its projection or projections 25 will be yieldingly rearwardly held in engagement with and between the spaced apart teeth 20. With the projections so engaging the teeth, the U-bar will be rigidly held against any movement relative to the chassis 10. To release the locking means for readjusting the U-bar relative to the chassis, it is merely necessary to grasp the laterally extending portion of the locking member and the adjacent U-bar and squeeze the two toward each other, thereby moving the rear end of the locking member forwardly and the projection or projections 25 out of engagement with the teeth 20. With the projection or projections free of the teeth, the U-bar and locking member are either swung upwardly or downwardly as desired. When the correct position of the brush relative to the ground surface has been obtained, it is merely necessary to release the grasp on the U-bar and locking member, and the spring characteristics of the locking member will move its projections into engagement with teeth thus locking the U-bar against independent swinging movement. Obviously, this phase of unlocking, adjusting the U-bar, and re-locking is accomplished with one hand and without removing the hand from its single grasping position.

While we have described our device as particularly adapted for use with lawn sweepers, it may be used on various types of vehicles and implements when height adjustments are desirable.

Some changes may be made in the construction and arrangement of our means for adjustably raising or lowering the frame of a wheel supported vehicle without departing from the real spirit and purpose of our invention, and it is our intention to cover by our claims, any modified forms of structure or use of mechanical equivalents which may be reasonably included within their scope.

We claim:

1. Manually operable means for adjusting the position of a frame relative to wheels upon which it is mounted, said means comprising, in combination:
    (a) a frame member having at least two spaced apart sides each having at least one elongated opening therein;
    (b) at least one wheel adjacent each of said two sides;
    (c) support members between each of said wheels and said sides, pivotally connected to said sides at a point spaced from said elongated openings;
    (d) an axle extending rigidly from each of said wheels through said support members and said elongated openings in said frame member;
    (e) a U-shaped member rigidly connected adjacent each of its extremities to said support members on opposite sides of said frame member; and
    (f) spring means biased into resilient engagement with both said U-shaped member and said frame member, and being manually removable from said resilient engagement to allow selective positioning of said frame member relative to said U-shaped member and thereby to said support members to which said U-shaped member is rigidly connected.

2. The invention according to claim 1 wherein said spring means comprises a single sheet of flexible material normally reposing at a predetermined angle and constrained in said resilient engagement between said U-shaped member and said frame member at an angle other than said predetermined angle.

3. The invention according to claim 2 including an elongated member extending through both of said two sides and pivotally connected to said support members on the opposite side of said axle from said U-shaped member.

4. The invention according to claim 3 wherein said spring means is held in said resilient engagement by a first end portion of said spring means engaging a portion of said U-shaped member and a second end portion of said spring means engaging a portion of said frame member, said spring means being disposed at other than said predetermined angle when both said first and second end portions thereof are in engagement with said portions of said U-shaped member and said frame member, respectively.

5. Manually operable means for adjusting the position of a frame relative to wheel supports upon which it is mounted, said means comprising, in combination:
    (a) a frame having at least two spaced apart sides each having an elongated opening therein;
    (b) axle means slidably engaged in each of said elongated openings;
    (c) a wheel rotatably mounted on each of said axle means outwardly of said frame;
    (d) frame support members mounted on each of said axle means and rotatable thereon independently of said wheels;
    (e) a U-shaped member rigidly connected adjacent each of its extremities to said frame support members on opposite sides of said frame;
    (f) a pivotal connection between each of said two sides of said frame and said frame support members adjacent thereto, said pivotal connection being on the opposite side of said axle means from said U-shaped member;
    (g) a plurality of outwardly extending projections on at least one of said two sides of said frame, and
    (h) connecting means extending from said U-shaped member and selectively engagable with said plurality of projections for changing the position of said frame relative to said wheels.

6. The invention according to claim 5 wherein said connecting means comprises a spring biased member held in resilient engagement between said U-shaped member and said projections.

7. The invention according to claim 4 wherein said spring biased member includes a first end portion engaging a portion of said U-shaped member and a second end portion engaging at least one of said plurality of projections.

8. The invention according to claim 7 wherein said spring biased member is so constructed and arranged that movement of said first end portion toward said U-shaped member disengages said second end portion from engagement with said projections.

References Cited in the file of this patent

UNITED STATES PATENTS

| | | |
|---|---|---|
| 334,424 | Fowler | Jan. 19, 1886 |
| 2,818,270 | Cataline | Dec. 31, 1957 |
| 2,836,430 | Langenbacher | May 27, 1958 |
| 2,848,859 | Abel | Aug. 26, 1958 |
| 2,915,318 | Chesser | Dec. 1, 1959 |